United States Patent
Steckenbauer

(10) Patent No.: US 10,987,901 B2
(45) Date of Patent: Apr. 27, 2021

(54) FOIL STOCK

(71) Applicant: AMAG Rolling GmbH, Braunau am Inn-Ranshofen (AT)

(72) Inventor: Hermann Steckenbauer, Ranshofen (AT)

(73) Assignee: AMAG Rolling GmbH, Braunau am Inn-Ranshofen (AT)

(*) Notice: Subject to any disclaimer, the term of this patent is extended or adjusted under 35 U.S.C. 154(b) by 0 days.

(21) Appl. No.: 15/315,724

(22) PCT Filed: Jun. 2, 2015

(86) PCT No.: PCT/EP2015/062310
§ 371 (c)(1),
(2) Date: Feb. 9, 2017

(87) PCT Pub. No.: WO2015/185581
PCT Pub. Date: Dec. 10, 2015

(65) Prior Publication Data
US 2017/0203545 A1    Jul. 20, 2017

(30) Foreign Application Priority Data

Jun. 2, 2014 (EP) .................... 14170809

(51) Int. Cl.
*B32B 15/01* (2006.01)
*B23K 20/04* (2006.01)
*B23K 20/233* (2006.01)
*B32B 15/085* (2006.01)
*B32B 9/00* (2006.01)
*C22C 21/00* (2006.01)
*B32B 9/04* (2006.01)
(Continued)

(52) U.S. Cl.
CPC ............ *B32B 15/016* (2013.01); *B23K 20/04* (2013.01); *B23K 20/2336* (2013.01); *B32B 7/12* (2013.01); *B32B 9/005* (2013.01); *B32B 9/045* (2013.01); *B32B 15/085* (2013.01); *B32B 27/32* (2013.01); *C22C 21/00* (2013.01); *C22C 21/02* (2013.01); *C22C 21/06* (2013.01); *B32B 2323/10* (2013.01); *B32B 2553/00* (2013.01); *Y10T 428/12764* (2015.01)

(58) Field of Classification Search
None
See application file for complete search history.

(56) References Cited

U.S. PATENT DOCUMENTS 9,855,592 B2 * 1/2018 Brinkman ............. B32B 15/011
2003/0165709 A1 9/2003 Gazapo
(Continued)

FOREIGN PATENT DOCUMENTS

DE  60024806 T2  6/2006
EP  2130669 A1  12/2009
(Continued)

*Primary Examiner* — Daniel J. Schleis

(57) ABSTRACT

A foil stock comprising at least one AlFeSi-based layer. The foil stock according to the invention comprises an AlMg-based core layer and an AlFeSi-based cladding layer of not more than 0.05% by weight, in particular of not more than 0.03% by weight magnesium (Mg), thereby ensuring high strength and good deformation and coating properties of a carrier foil produced from said foil stock.

14 Claims, 2 Drawing Sheets

(51) Int. Cl.
*B32B 27/32* (2006.01)
*C22C 21/02* (2006.01)
*C22C 21/06* (2006.01)
*B32B 7/12* (2006.01)

(56) References Cited

U.S. PATENT DOCUMENTS

| | | |
|---|---|---|
| 2010/0159275 A1 | 6/2010 | Geho |
| 2010/0170669 A1* | 7/2010 | Jaworowski ......... B23K 35/286 |
| | | 165/173 |
| 2010/0304175 A1* | 12/2010 | Kilmer ............... B23K 35/0233 |
| | | 428/576 |
| 2013/0302642 A1* | 11/2013 | Ren ........................ F28F 1/003 |
| | | 428/654 |
| 2014/0193666 A1* | 7/2014 | Brinkman .......... B23K 20/2336 |
| | | 428/654 |

FOREIGN PATENT DOCUMENTS

| | | | |
|---|---|---|---|
| EP | 2492089 A1 | | 8/2012 |
| EP | 2570257 | * | 3/2013 |
| EP | 2570257 A1 | | 3/2013 |
| WO | WO2013037918 | * | 3/2013 |

* cited by examiner

US 10,987,901 B2

FOIL STOCK

FIELD OF THE INVENTION

The invention relates to a foil stock with at least one AlFeSi-based layer.

BACKGROUND OF THE INVENTION

In the prior art, there are known foils based on AlFeSi and ones based on an aluminum alloy of the 8xxx series (DE60024806T2). To manufacture them, an AlFeSi-based foil stock (for example defined in the standard DIN EN 12482-1 or DIN EN 12482-2) is cold rolled to a desired foil thickness in several rolling steps and is then soft-annealed in order to reduce manufacturing-induced cold work hardening phenomena.

Such AlFeSi foils are used, for example, in composite foils for packaging materials, in order, as a diffusion-resistant carrier foil, to meet the requirements for a coating by means of priming, painting, or lamination (EP2492089A1), Manufacturing foil from an AlFeSi foil stock has the disadvantage that ensuring both a sufficient mechanical strength and a sufficient cold formability of the foil produced is comparatively labor-intensive. Furthermore, an AlFeSi foil stock requires a relatively high purity content of alloying elements such foil stocks are therefore usually made of primary aluminum, which has a negative impact on the manufacturing costs.

SUMMARY OF THE INVENTION

The stated object of the invention, therefore, is to modify a foil stock of the type mentioned at the beginning in such a way that this facilitates the manufacture of foils, with a nevertheless expected reduction in the strength, cold formability, diffusion resistance, and/or coatability of the foil that is manufactured from it. The foil stock should also be inexpensive.

The invention attains the stated object in that the foil stock has an AlMg-based core layer and an AlFeSi-based cladding layer containing a maximum of 0.05 wt %, in particular 0.03 wt %, magnesium (Mg).

If the foil stock has an AlMg-based core layer and an AlFeSi-based cladding layer containing 0 to at most 0.05 wt % magnesium (Mg), then first of all—and indeed because of the AlMg basis—, it is possible to use an inexpensive alloy with a high level of secondary aluminum. In addition—due to the AlFeSi cladding layer—comparatively high requirements of diffusion resistance and coatability are met. The latter is particularly ensured by the comparatively low Mg content of 0 to at most 0.05 wt % magnesium (Mg), with the AlFeSi cladding layer also serving as a barrier layer against an unwanted Mg diffusion from the core layer into the oxide layer of the foil stock. Foils manufactured from the foil stock according to the is can therefore satisfy extremely rigorous demands for the coating for example by means of printing, painting, or lamination even with comparatively long storage times. This can be improved even more if the AlFeSi cladding layer has a further reduced Mg content of 0 to at most 0.03 wt % magnesium (Mg). The AlFeSi cladding layer according to the invention can also significantly facilitate the foil manufacture. To be specific, even during the annealing of the completely rolled foil stock, this cladding layer provides a barrier layer against an unwanted Mg diffusion from the core layer into the oxide layer of the foil. The percentage of magnesium-containing oxides can thus remain minimal and most labor-intensive countermeasures in the foil manufacture can be avoided, in addition, this multilayered structure of the foil stock can ensure a particularly advantageous combination of foil properties, namely high strength due to the AlMg-based core layer and good formability due to the AlFeSi-based cladding layer. A foil manufactured out of it can therefore, as part of a packaging design, follow even tight bending radii and can subsequently enable correspondingly complex packaging designs that, due to their high rigidity, are dimensionally stable enough to accommodate an extremely wide variety of products. This can even be achieved if thin foils are used in order to reduce the amount of packaging material, The AlFeSi alloy percentage of the foil stock can also be reduced in order to achieve the advantages cited above, which can bring advantages in the manufacturing costs.

In general, it should be noted that the foil stock can be composed of the core layer and the cladding layer, In addition, a foil stock can generally be defined by the standard DIN EN 12482-1 (hot-rolled foil stock) and the standard DIN EN 12482-2 (cold-rolled foil stock).

For the sake of completeness, it should be noted that "secondary aluminum" can be understood to be any aluminum or aluminum alloy chiefly obtained from scrap aluminum.

In addition, it should be generally noted that "foil" can be understood to be a sheet or band with a thickness of 0.006 to 0.2 mm. A "foil stock" can be understood to be a sheet or band with a thickness of 0.2 to 1 mm.

It should also be generally noted that the expression "AlMg-based layer" does not rule out any aluminum alloy that has Al as a main component and also has a lower percentage by weight of Mg, which does not exclude the possibility of other alloying elements contained in lower percentages than the Al and Mg being present in this AlMg-based layer. The same is also true in the figurative sense for the other layer composed of a different basis (AlFeSi-based, AlMgMn-based, AlFeSiMn-based, etc.).

Advantageous shaping properties in the foil stock and also in the foil manufactured from it can be achieved if the core layer is AlMgMn-based and the cladding layer is AlFeSiMn-based.

The core layer can be advantageously composed of an aluminum alloy of the 5xxx series in order to thus permit a high percentage of secondary aluminum It is thus also possible during the annealing or soft annealing of the formed or rolling-reduced foil stock to establish a comparatively good ratio of strength—influenced among other things by $Mg_2Si$ precipitation phenomena and the number of displacements—to a sufficient formability. A foil of this kind can therefore be particularly suitable for use as a carrier foil for a packaging material.

If the core layer contains at most 6 wt % magnesium (M), then it is possible to reduce the risk of increased Mg diffusion from the core layer into the AlFeSi cladding layer and to its outer boundary layer or surface. It is therefore unnecessary to expect disadvantages with regard to the resulting reduced suitability for coating and printing or painting—although the foil stock or the foil produced from it does contain Mg as an alloying component The cladding, layer can preferably be composed of an aluminum alloy of the 8xxx series in order to be able to ensure advantages with, regard to coatability by means of printing, painting, or lamination or with regard to a material adhesion bonding by means of adhesive.

Thin-walled foils can be produced from the foil stock if the cladding layer is provided on the core layer. The application field of the foil stock can be expanded and its use can be facilitated if a cladding layer is provided on both sides of the core layer, It is thus possible to improve the cold formability of the foil produced from the foil stock. In addition, this can facilitate the lather processing of the foil stock because both outsides thus have the same mechanical and chemical properties.

Extremely high requirements for a coating by means of printing, painting, or lamination can be reproducibly met if the thickness of, the cladding, layer amounts to at least 3%. With a layer thickness of this kind, it is specifically possible to avoid an. Mg diffusion to the outer boundary layer or surface during the soft annealing of the foil-rolled backing layer, even with comparatively long exposure times.

If the thickness of the cladding layer corresponds to at least 10% of the overall thickness of the foil stock, then an additional reserve can be produced with regard to the increased formability of the foil and Mg concentration variations within the layer composite.

The cladding layer can permit particularly high values in diffusion resistance and cold formability if it contains
    0.40 to 2.0 wt % iron (Fe),
    0.05 to 1.1 wt % silicon (Si),
    and the rest is composed of aluminum and manufacture-dictated inevitable Impurities. In particular, a content of 0.50 to 1.15 wt % iron (Fe) can be advantageous in this case. In this context, this cladding layer can optionally contain one or more of the following alloying elements:
    0.05 to 1.0 wt % manganese (Mn),
    max. 0.3 wt % copper (Cu),
    max. 0.05 wt % chromium (Cr),
    max. 0.2 wt % zinc (Zn),
    max. 0.08 wt % titanium (Ti)
    max 0.05 wt % tin (Sit), sodium (Na), antimony (Sb), zirconium (Zr), Hafnium (Hf), or boron (B).

In general, it should be noted that the cladding layer can contain impurities, each totaling at most 0.05 wt % and altogether totaling at most 1 wt %.

In particular, the foil stock can be used to manufacture a carrier foil, for example used in a composite foil for a packaging material.

If the composite foil has a plastic layer, then it is possible with the aid of a comparatively simple design measure to protect the carrier foil from contact corrosion with the packed articles.

The structural design of the composite foil can be further simplified if a plastic layer is a plastic film, in particular a polypropylene film, that is laminated onto the cladding layer.

The invention can particularly excel if the foil stock according to the invention is used to manufacture a carrier foil for a composite foil of a packaging material,

BRIEF DESCRIPTION OF THE DRAWINGS

The subject of the invention will be described in greater detail below in conjunction with an exemplary embodiment shown in the drawings. In the drawings.

DETAILED DESCRIPTION OF THE PREFERRED EMBODIMENTS

Figure 1:
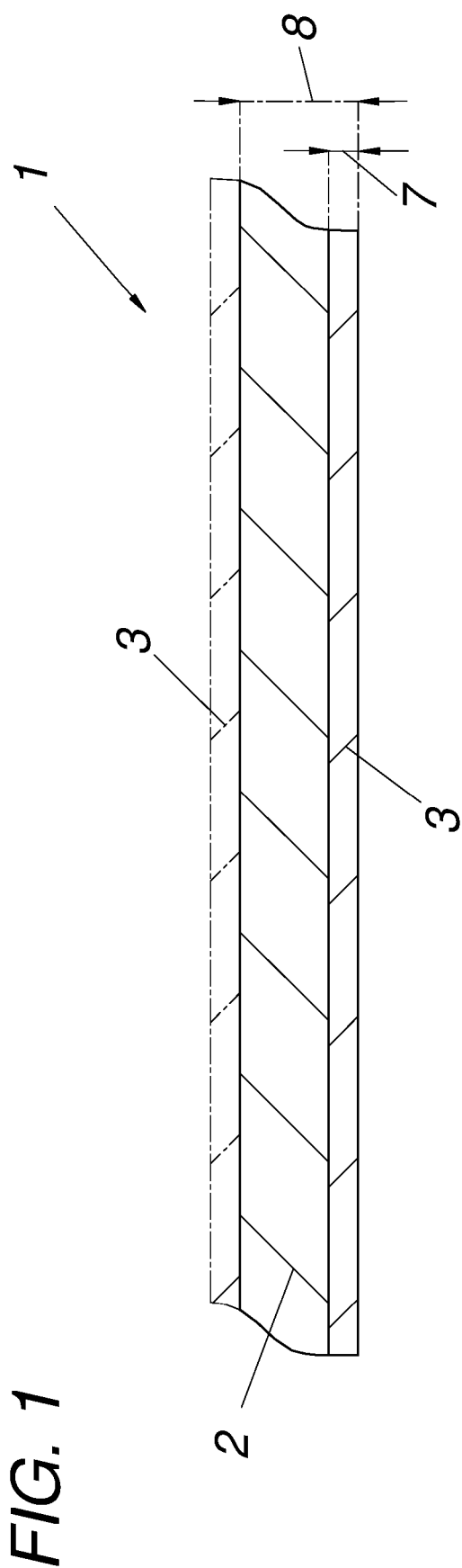
FIG. 1 shows an enlarged sectional view of a multilayered foil stock.

The foil stock 1 shown by way of example according to FIG. 1 has a multilayered structure. It has a core layer 2 and a cladding layer 3. The cladding layer 3 is provided on one side of the core layer 2; optionally, this cladding layer 3 can also be provided on both sides of the core layer 2—as has been depicted with dashed lines according to FIG. 1.

Figure 2:
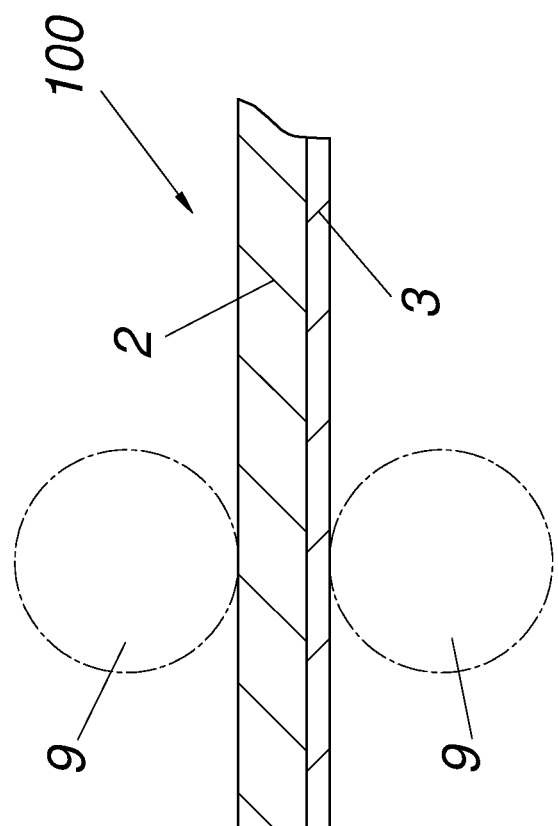
FIG. 2 shows an enlarged sectional view of a carrier foil, manufactured from the foil stock according to FIG. 1.
Figure 3:
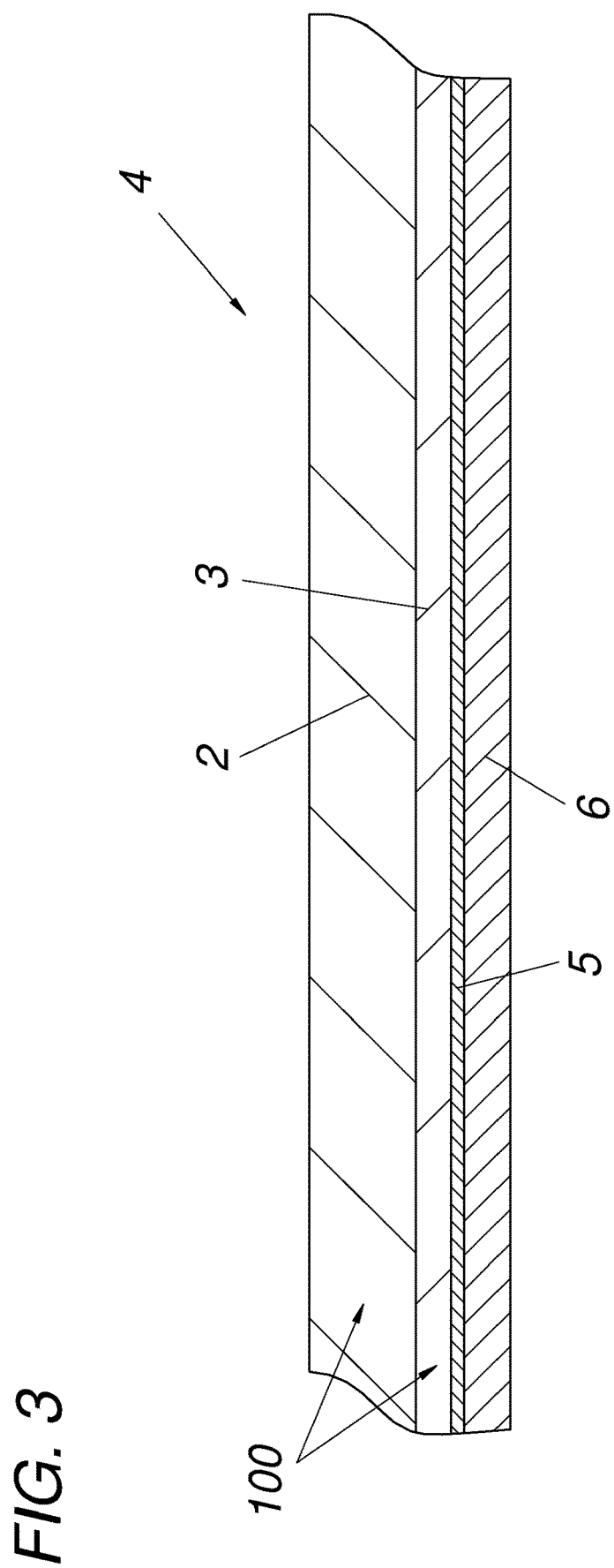
FIG. 3 shows an enlarged sectional view of a composite foil having the earner foil according to FIG. 2.

For the manufacture of a foil or carrier foil 100, the foil stock 1 passes through a foil rolling—for example indicated by a pair of rollers in FIG. 2—and a subsequent annealing, not shown in detail, in order to then be usable, for example, as a carrier foil 100 in a composite foil 4 according to FIG. 3. This carrier foil 100 of the composite foil 4, in addition to its strength-determining function, is also used for coating, printing, painting, laminating, or the like and also forms the barrier layer of the packaging material. Such a packaging material can be formed out of the composite foil 4 by means of cold forming, for example in the form of tensile-compressive forming, deep drawing, stretch forming, or the like.

The carrier foil 100 must therefore be able to exhibit the property of a sufficient formability for shaping, a sufficient strength to ensure a high dimensional stability for securely accommodating products/goods, a barrier layer, and a sufficient coatability.

This is attained according to the invention by the fact that the foil stock 1 has an AlMg-based core layer 2 and an AlFeSi-based cladding layer 3 containing at most 0.05 wt % magnesium (Mg). Due to the fact that it is AlMg-based, for example made of a 5049 alloy, the core layer 2 provides the carrier foil 100 with a sufficient strength, which ensures the stability of the packaging material. The AlFeSi-based cladding layer 3, for example, made of an 8011 alloy, because of its low magnesium content of 0 to at most 0.05 wt %, preferably at most 0.03 wt %, provides a high formability and stable coatability for printing, painting, or the like of the carrier foil 100. The latter advantage is particularly determined by the avoidance of magnesium-containing oxide such as MgO, $MgAl_2O_4$, or the like in the oxide layer—which according to the invention, also cannot be negatively affected by the high Mg content of the core layer 2 since the cladding layer 3 exhibits a barrier effect against it. These advantages are also exhibited with a soft annealing of the completely rolled foil stock 1. In this connection, it should be generally noted that an AlFeSi-based composition can be any alloy of the 8xxx series with a content of at most 0.05 wt %, in particular at most 0.03 wt % magnesium.

As can also be inferred from FIG. 3, the carrier foil 100 is provided with a polypropylene plastic film 5, which is laminated onto the carrier foil 100 with the aid of an adhesive 6. Among other things, the polypropylene plastic film 5 offers a chemical protection of the carrier foil 100 from the packed articles, which are not shown in detail, The cladding layer 3 of the composite foil 4 is therefore provided on the inside of the packaging material and ensures a particularly stable, integrally joined adhesive bond with the plastic film 5. A cladding layer 3 can, however, also be provided on the outside of the core, layer 2, which is not shown in detail, in order to thus facilitate printing, painting, etc of the packaging material.

With the measure that the core layer 2 contains at most 6 wt % magnesium (Mg) and the thickness 7 of the cladding layer 3 corresponds to at least 3%, in particular at least 10%, of the overall thickness 8 of the cladding layer 1, the core layer 2 can provide a sufficiently effective diffusion barrier for Mg—even with long storage times—during the annealing of the completely rolled foil stock 1 as well, in order to achieve the advantages according to the invention, the thickness 7 of the cladding layer 3 is adjusted particularly in accordance with the overall thickness of the foil stock and the magnesium content of the core layer 2. This percentage of the cladding layer 3 is then provided to be in a higher range, e.g. 7 to 10%, when the magnesium content of the core layer 2 is increased and/or the overall thickness of the foil stock is reduced.

A thickness of the cladding layer 3 of at least 10% of the overall thickness of the foil stock is accompanied by an additional reserve with regard to an increased formability of the foil and Mg concentration variations within the layered composite.

As explained above, the reduced Mg diffusion into the oxide layer of the cladding layer 3 in turn has an advantageous effect on the coatability. This therefore demonstrates that the invention unites a combination of the required properties despite the use of secondary aluminum.

The invention claimed is:

1. A foil consisting of a rolled foil stock composed of two or three layers, the foil stock comprising:
    an AlMg-based core layer composed of an aluminum alloy of the 5xxx series and containing at most 6 wt % magnesium; and
    an AlFeSi-based cladding layer containing 0.40 to 2.0 wt % iron, 0.05 to 1.1 wt % silicon, and a maximum of 0.05 wt % magnesium (Mg), wherein the cladding layer is an outer layer of the foil stock and the cladding layer is adhered directly to the core layer;
    wherein the foil stock is rolled to form the foil.

2. The foil according to claim 1, wherein the core layer is AlMgMn-based and the cladding layer is AlFeSiMn-based.

3. The foil according to claim 1, wherein the cladding layer is composed of an aluminum alloy of the 8xxx series.

4. The foil according to claim 1, wherein a thickness of the cladding layer corresponds to at least 3% of an overall thickness of the foil stock.

5. The foil according to claim 1, wherein a thickness of the cladding layer corresponds to at least 10% of an overall thickness of the foil stock.

6. The foil according to claim 1, wherein the cladding layer contains:
    0.40 to 2.0 wt % iron (Fe),
    0.05 to 1.1 wt % silicon (Si),
    and optionally one or more of the following alloying elements:
    0.05 to 1.0 wt % manganese (Mn),
    max. 0.3 wt % copper (Cu),
    max. 0.05 wt % chromium (Cr),
    max. 0.2 wt % zinc (Zn),
    max. 0.08 wt % titanium (Ti),
    max. 0.05 wt % tin (Sn), sodium (Na), antimony (Sb), zirconium (Zr), hafnium (Hf), or boron (B),
    and a remainder of aluminum and manufacture-dictated inevitable impurities.

7. The foil according to claim 1, wherein the foil stock comprises either a hot-rolled foil stock or a cold-rolled foil stock.

8. The foil according to claim 1, wherein the cladding layer contains a maximum of 0.03 wt % magnesium (Mg).

9. The foil according to claim 1, comprising two layers of the cladding layer, wherein a layer of the cladding layer is provided on each side of the core layer.

10. The foil according to claim 1, wherein the foil stock is composed of a single AlMg-based core layer and a single AlFeSi-based cladding layer.

11. A carrier foil consisting of the foil according to claim 1.

12. A composite foil for a packaging material, comprising a plastic layer and the carrier foil according to claim 11.

13. The composite foil according to claim 12, wherein the plastic layer is a plastic film that is laminated onto the cladding layer.

14. Packaging material, comprising the composite foil according to claim 12.

* * * * *

UNITED STATES PATENT AND TRADEMARK OFFICE
CERTIFICATE OF CORRECTION

PATENT NO. : 10,987,901 B2  
APPLICATION NO. : 15/315724  
DATED : April 27, 2021  
INVENTOR(S) : Hermann Steckenbauer Page 1 of 1

It is certified that error appears in the above-identified patent and that said Letters Patent is hereby corrected as shown below:

In the Specification

Column 2, Line 53, "(M)" should read --(Mg)--.
Column 3, Line 33, "(Sit)" should read --(Sn)--.

Signed and Sealed this  
Twenty-fifth Day of October, 2022

Katherine Kelly Vidal  
*Director of the United States Patent and Trademark Office*